3,580,921
HETEROCYCLIC MESOIONIC COMPOUNDS
Donald P. Cameron, New London, Conn., assignor to
Pfizer Inc., New York, N.Y.
No Drawing. Filed Sept. 20, 1968, Ser. No. 761,319
Int. Cl. C07d 91/54
U.S. Cl. 260—302                                    12 Claims

ABSTRACT OF THE DISCLOSURE

A series of novel aryl anhydro 1,2,3-thiadiazolium hydroxide bases and their acid addition salts have been prepared. The anhydro 4-hydroxy-3-(2-substituted phenyl)-1,2,3-thiadiazolium hydroxides produced are all active monoamine oxidase inhibitors and are useful in therapy as non-steroidal anti-inflamatory agents.

BACKGROUND OF THE INVENTION

This invention relates to new and useful mesoionic compounds in the field of heterocyclic chemistry. More particularly, it is concerned with various novel aryl anhydro 1,2,3-thiadiazolium hydroxides and their pharmaceutically acceptable acid addition salts, which have been found useful in therapy in view of their non-steroidal anti-inflammatory properties.

In the past, various attempts have been made by investigators in the field of organic medicinal chemistry to obtain new and useful anti-inflammatory agents. For the most part, these efforts have involved the synthesis and testing of various steroidal hormones such as the corticosteroids. However, in the search for new and still better anti-inflammatory agents, a great deal less is known about the effect of non-steroidal agents in this area, albeit they are attractive since they would necessarily lack the various untoward side effects normally associated with steroid compounds. This is particularly true in the case of the present aryl anhydro 1,2,3-thiadiazolium hydroxides, where the closest prior art is that of G. F. Duffin et al., appearing in the Journal of the Chemical Society (London), p. 3189 (1956), which teaches the preparation of certain particular anhydro 4-hydroxy-3-phenyl-1,2,3-thiadiazolium hydroxides having a para substituent on the aromatic ring like anhydro 4-hydroxy-3-(4-methoxyphenyl)-1,2,3 - thiadiazolium hydroxide, for example.

SUMMARY OF THE INVENTION

In accordance with the present invention, it has now been surprisingly found that certain novel aryl anhydro 1,2,3-thiadiazolium hydroxide compounds possessing a 2-substituted phenyl moiety are of value in the field of drug therapy when employed as non-steroidal anti-inflammatory agents. The novel mesoionic compounds of this invention are all selected from the group consisting of anhydro 4 - hydroxy - 3-(2 - substituted phenyl) - 1,2,3-thiadiazolium hydroxide bases having the formula:

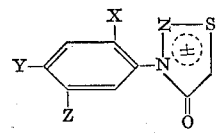

and the mineral and organic acid addition salts thereof, wherein X is a member selected from the group consisting of fluorine, chlorine, bromine, methoxy, ethoxy and trifluoromethyl; Y is a member selected from the group consisting of hydrogen, chlorine, bromine, alkyl and alkoxy each containing up to three carbon atoms, and Z is a member selected from the group consisting of chlorine, bromine, trifluoromethyl and alkyl and alkoxy each containing up to three carbon atoms, with at least two of said X, Y and Z always being other then fluorine, chlorine, and bromine. These novel compounds are all useful in alleviating the painful effects caused by various inflammatory conditions. In addition, they are also useful in effectively inhibiting the enzyme known as monoamine oxidase.

Of especial interest in this connection, as typical member compounds of the present invention, are such anhydro 4-hydroxy-3-(2-alkoxyphenyl) - 1,2,3 - thiadiazolium hydroxides as anhydro 4-hydroxy-3-(5-chloro-2,4-dimethoxyphenyl)-
  1,2,3-thiadiazolium hydroxide,
anhydro 4-hydroxy-3-(4-chloro-2,5-dimethoxyphenyl)-
  1,2,3-thiadiazolium hydroxide,
anhydro 4-hydroxy-3-(4-chloro-2-methoxy-5-methyl-
  phenyl)-1,2,3-thiadiazolium hydroxide,
anhydro 4-hydroxy-3-(2-methoxy-5-trifluoromethyl-
  phenyl)-1,2,3-thiadiazolium hydroxide,
anhydro 4-hydroxy-3-(5-chloro-2-methoxyphenyl)-
  1,2,3-thiadiazolium hydroxide,
anhydro 4-hydroxy-3-(5-chloro-2-methoxy-4-methyl-
  phenyl)-1,2,3-thiadiazolium hydroxide,
anhydro 4-hydroxy-3-(2-methoxy-5-methylphenyl)-
  1,2,3-thiadiazolium hydroxide,
anhydro 4-hydroxy-3-(2-methoxy-4,5-dimethylphenyl)-
  1,2,3-thiadiazolium hydroxide,
anhydro 4-hydroxy-3-(2,4,5-trimethoxyphenyl)-1,2,3-
  thiadiazolium hydroxide and
anhydro 4-hydroxy-3-(2,5-dimethoxyphenyl)-1,2,3-
  thiadiazolium hydroxide.

DETAILED DESCRIPTION OF THE INVENTION

In accordance with the process employed for preparing the novel compounds of this invention, an appropriately substituted aniline is first diazotized in a conventional manner and then treated with mercaptoacetic acid (i.e., thioglycolic acid) in accordance with the general procedure of G. F. Duffin et al., as described in the Journal of the Chemical Society (London), p. 3189 (1956). In many instances, the intermediate arylazothioacetic acids (ArN=NSCH$_2$COOH) first formed by the reaction of the aryl diazonium salt compounds (ArN$_2$X) with mercaptoacetic acid, are isolated from the reaction mixture before conversion to the desired anhydro 1,2,3-thiadiazolium hydroxide compound as a final step and this, despite the fact that said reference article teaches such orthosubstituted type compounds could not be isolated. However, such intermediate compound formation is, in turn, largely dependent upon the stability of the particular arylazothioacetic acid at hand, as well as on the pH of the resulting medium, with maximum intermediate compound formation normally occurring somewhere between about pH 2 and pH 6, i.e., at about or near the isoelectric point of the mixture, which is usually preferably between about pH 2.5–4. The unstable aryl diazo sulfide compounds, on the other hand, are, of course, converted directly to the thiadiazolium final product without isolation and in both instances, this is usually accomplished by the use of a suitable dehydrating agent, such as lower alkane hydrocarbon carboxylic acid anhydride like acetic anhydride, in the presence of a base, although the use of the latter reagent is not always absolutely necessary in every case. Recovery of the desired final products of this invention from the aforesaid reaction mixture is then readily effected by a number of conventional means and most preferably, in difficult cases, by means of selective precipitation of the product as the hydrochloride salt from non-polar solvents.

The starting materials required for the overall reaction process of this invention are either all known compounds or else they are easily prepared by those skilled in the art from readily available chemical materials in accordance with standard organic procedure. For instance, the specific starting aniline compounds employed are known and/or readily prepared by standard technology. On the other hand, a slight modification in the aforesaid general procedure of G. F. Duffin et al. is called for when attempting to prepare, i.e., isolate, the intermediate arylazothioacetic acids and this usually involves carrying out the following procedural steps or conditions, viz, (1) high aqueous dilution; (2) the use of freshly distilled mercaptoacetic acid; (3) maintenance of pH in the range of 2.5–4 during the course of the reaction, as previously discussed, and (4) conducting the entire operation at a temperature in the range of —10° C. to —5° C. In most instances, however, the arylazothioacetic acids of this invention are not characterized, but are simply converted to the corresponding arylanhydro 1,2,3 - thiadiazolium hydroxides direct, without any isolation of the intermediate compound as previously indicated.

In accordance with a more specific embodiment of the process of this invention, the desired arylazothioacetic acid is extracted from the reaction mixture with a suitable water-immiscible organic solvent, such as a halogenated hydrocarbon solvent like methylene chloride, and the resultant extract is thereafter cooled to —30° C. and subsequently treated with cold acetic anhydride and a base, such as pyridine or potassium bicarbonate, followed by concentration of the resulant mixture in vacuo. After removal of the solvent in this manner, the reaction is allowed to proceed in the concentrate at ambient temperatures (~25° C.) for a period of about twelve hours to ultimately yield the desired anhydrothiadiazolium hydroxide compound, usually in the form of a crystalline precipitate. In those specific instances where precipitation of the latter does not readily occur from solution, the reaction mixture is normally hydrolyzed at 0° C. and at about pH 2–3, followed by extraction, same as before, with the dried solvent extracts subsequently being treated with hydrochloric acid to then afford the corresponding hydrochloride salt as the precipitate. These salts are then subsequently converted back to the free base compound in yields as high as 80–95%, especially when aqueous sodium bicarbonate is employed as the reagent of choice for such purposes.

Inasmuch as the aryl anhydro 1,2,3-thiadiazolium hydroxide compounds of this invention are basic compounds, they are capable of forming a wide variety of different salts with various mineral and organic acids. Although such salts must be pharmaceutically acceptable when the final products are intended even for animal use, it is possible to first isolate the desired aryl anhydro 1,2,3-thiadiazolium compound from the reaction mixture as a pharmaceutically unacceptable salt and then to subsequently convert the latter, as foresaid, to the free base compound by treatment with an alkaline reagent, followed by the final conversion to the pharmaceutically acceptable acid salt in the manner hereinafter indicated. For instance, the acid addition salts of the aryl anhydro 1,2,3-thiadiazolium hydroxide compounds of this invention may be prepared by treating the base compound with a substantially equimolar amount of the chosen acid. The salt-formation step can be carried out in an aqueous solution or in a suitable organic solvent, such as methanol or ethanol. Upon careful evaporation of the solvent, the solid salt is obtained.

The acids which are used to prepare the pharmaceutically acceptable acid addition salts of the aforementioned aryl anhydro 1,2,3-thiadiazolium hydroxide base compounds of this invention are those which form non-toxic acid addition salts containing pharmaceutically acceptable anions, such as the hydrochloride, hydrobromide, hydroiodide, nitrate, sulfate or bisulfate, phosphate, lactate, citrate, or acid citrate, tartrate or bitartrate, succinate, maleate, gluconate, saccharate, methanesulfonate, ethanesulfonate benzenesulfonate and p-toluenesulfonate salts.

As previously indicated, the aryl anhydro 1,2,3-thiadiazolium hydroxide compounds of the present invention are all readily adapted to therapeutic use as anti-inflammatory agents, particularly in view of their ability to reduce the swelling and relieve the pain caused by arthritic and other inflammatory disorders that are normally associated with such basic ailments as rheumatoid arthritis and the like. For instance, anhydro 4-hydroxy-3-(5 - chloro - 2,4 - dimethoxyphenyl)-1,2,3-thiadiazolium hydroxide, a typical and preferred agent of the present invention, exhibits a remarkable degree of activity in the standard carrageenin-induced rat foot edema test, where it was found to be somewhat comparable to indomethacin as regards potency. Additionally, it is a moderately active inhibitor of the enzyme known as monoamine oxidase, roughly of the same order of magnitude as α-methylphenylhydrazine in this respect, from both the in vitro and in vivo points of view. Moreover, none of these compounds cause substantial side effects to occur in the subject to whom they are so administered, i.e., no problems of toxicity or of a harmful pharmacological nature, either gross or microscopic, are encountered when said compounds are administered for the aforestated purpose as indicated above.

In accordance with a method of treatment of the present invention, the herein described aryl anhydro 1,2,3-thiadiazolium hydroxide anti-inflammatory agents can be administered to an afflicted subject via either the oral or parenteral routes of administration. In general, these compounds are most desirably administered in doses ranging from about 10 mg. up to about 1.0 g. per day, although variations will still necessarily occur depending upon the weight of the subject being treated. However, a dosage level that is in the range of from about 0.01 mg. to about 15 mg. per kg. of body weight per day is most desirably employed in order to achieve effective results. Nevertheless, it is still to be appreciated that other variations may also occur in this respect, depending upon the species of animal being treated and its individual response to said medicament, as well as on the particular type of pharmaceutical formulation chosen and the time period and interval at which such administration is carried out. In some instances, dosage levels below the lower limit of the aforesaid range may be more than adequate, while in other cases still larger doses may be employed without causing any harmful or deleterious side effects to occur provided that such higher dose levels are first divided into several smaller doses that are to be administered throughout the day.

In connection with the use of the aryl anhydro 1,2,3-thiadiazolium hydroxide compounds of this invention for the treatment of arthritic subjects, it is to be noted that they may be administered either alone or in combination with pharmaceutically acceptable carriers by either of the routes previously indicated and that such administration can be carried out in both single and multiple dosages. More particularly, the novel compounds of this invention can be administered in a wide variety of different dosage forms, i.e., they may be combined with various pharmaceutically acceptable inert carriers in the form of tablets, capsules, lozenges, troches, hard candies, powders, sprays, creams, salves, suppositories jellies, pastes, lotions, ointments, aqueous suspensions, injectable solutions, elixirs, syrups and the like. Such carriers include solid diluents or fillers, sterile aqueous media and various non-toxic organic solvents, etc. Moreover, such oral pharmaceutical compositions can be suitably sweetened and/or flavored by means of various agents of the type commonly employed for just such a purpose. In general, the therapeutically-effective compounds of this invention are present in such dosage forms at concentration levels ranging from about 0.5% to about 90% by weight of the total composition, i.e., in amounts which are sufficient to provide the desired unit dosage.

For purposes of oral administration, tablets containing various excipients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia. Additionally, lubricating agents such as magnesium stearate, sodium lauryl sulfate and talc are often very useful for tabletting purposes. Solid compositions of a similar type may also be employed as fillers in soft and hard filled gelatin capsules; preferred material in the connection would also include lactose or milk sugar as well as high molecular weight polyethylene glycols. When aqueous suspensions and/or elixirs are desired for oral administration, the essential active ingredient therein may be combined with various sweetening or flavoring agents, coloring matter or dyes, and, if so desired, emulsifying and/or suspending agents as well, together with such diluents as water, ethanol, propylene glycol, glycerin and various like combinations thereof.

For purposes of parenteral administration, solutions of these particular aryl anhydro 1,2,3-thiadiazolium hydroxides in either sesame or peanut oil or in aqueous propylene glycol may be employed, as well as sterile aqueous solutions of the corresponding water-soluble acid addition salts previously enumerated. Such aqueous solutions should be suitably buffered if necessary and the liquid diluent first rendered isotonic with sufficient saline or glucose. These particular solutions are especially suitable for intravenous, intramuscular and subcutaneous injection purposes. Additionally, it is also possible to administer the aforesaid heterocyclic mesoionic compounds topically when treating inflammatory conditions of the skin and this may be done preferably by way of creams, salves, jellies, pastes, ointments and the like, in accordance with standard pharmaceutical practice.

This invention is still further illustrated by the following examples, which are not to be construed in any way or manner as imposing limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

Example I

A suspension consisting of 37.4 g. (0.2 mole) of 5-chloro-2,4-dimethoxy-aniline in 100 ml. of 5 N hydrochloric acid was diluted to 500 ml. with water and ice. A solution totalling 14 g. of sodium nitrate in 25 ml. of water was then added to the stirred suspension during the course of a three-minute period. After stirring the resulting solution for 45 minutes at 0° C., the excess nitrite present was destroyed by the rapid addition of excess urea to the mixture. The resulting reaction mixture was then rapidly quenched into a stirred solution consisting of 20 g. (0.218 mole) of freshly distilled mercaptoacetic acid and approximately 1 kg. of ice. An immediate precipitate formed at this point and after stirring at 0° C. for 20 minutes, it was subsequently ioslated by means of extraction with 2 liters of diethyl ether. The ether extracts were then washed with water, dried over anhydrous magnesium sulfate and the dried filtrate subsequently concentrated in vacuo to give 42.1 g. (73%) of 5-chloro-2,4-dimethoxyphenylazothioacetic acid, M.P. 76–78° C. (dec.).

The diazo sulfide, prepared as described above, was then dissolved in 120 ml. of acetic anhydride and 50 ml. of pyridine at 0° C., and thereafter stirred at this point for a period of 4.5 hours, during which time a bright yellow precipitate soon formed. The latter product was subsequently isolated by means of filtration, followed by careful washing with cold cyclohexane. In this way, there were obtained 18 g. of crude anhydro material (M.P. 171–175° C.). After recrystallization from methanol (250 ml.) in the presence of activated carbon, there were finally obtained 13.25 g. of pure anhydro 4-hydroxy-3-(5-chloro-2,4-dimethoxyphenyl)-1,2,3-thiadiazolium hydroxide, M.P. 174–175° C. (analytical sample, M.P. 174.5–175° C.).

Analysis.—Calcd. for $C_{10}H_9ClN_2O_3S$ (percent): C, 44.0; H, 3.3; N, 10.3; S, 11.8. Found (percent): C, 44.1; H, 3.2; N, 10.2; S, 11.8.

Example II

The procedure decribed in Example I was repeated using 4-chloro-2,5-dimethoxyaniline as starting material in place of the isomeric compound used in the preceding example. In this particular case, the corresponding intermediate product obtained was 4-chloro-2,5-dimethoxyphenylazothioacetic acid (M.P. 86–87° C.) and the final product was anhydro 4-hydroxy-3-(4-chloro-2,5-dimethoxyphenyl)-1,2,3-thiadiazolium hydroxide, M.P. 167.5–168° C.

Analysis.—Calcd. for $C_{10}H_9ClN_2O_3S$ (percent): C, 44.0; H, 3.3; N, 10.3; S, 11.8. Found (percent): C, 44.0; H, 3.3; N, 10.5; S, 11.8.

Example III

The procedure described in Example I was repeated using an equivalent amount in moles of 2-methoxy-5-trifluoromethylaniline in place of 5-chloro-2,4-dimethoxyaniline as starting material for the overall reaction. In this particular case, the corresponding intermediate obtained was 2-methoxy-5-trifluoromethylphenylazothioacetic acid (M.P. 72–73° C.) and the final product was anhydro 4-hydroxy-3-(2 - methoxy-5-trifluoromethylphenyl)-1,2,3-thiadiazolium hydroxide, M.P. 171.5–172° C.

Analysis.—Calcd. for $C_{10}H_7F_3N_2O_2S$ (percent): C, 43.5; H, 2.6; N, 10.1; S, 11.6. Found (percent): C, 43.8; H, 2.4; N, 9.9; S, 11.3.

Example IV

The procedure described in Example I was repeated using an equivalent amount in moles of 5-chloro-2-methoxy-4-methylaniline in place of 5-chloro-2,4-dimethoxyaniline as starting material for the overall reaction. In this particular case, the corresponding intermediate obtained was 5-chloro - 2 - methoxy-4-methylphenylazothioacetic acid (M.P. 75–76° C.) and the final product was anhydro 4-hydroxy-3-(5-chloro - 2 - methoxy-4-methylphenyl)-1,2,3-thiadiazolium hydroxide, M.P. 162–162.5° C.

Analysis.—Calcd. for $C_{10}H_9ClN_2O_2S$ (percent): C, 46.8; H, 3.5; N, 10.9; S, 12.5. Found (percent): C, 46.8; H, 3.5; N, 10.9; S, 12.4.

Example V

The procedure described in Example I was repeated using an equivalent amount in moles of 2-methoxy-4,5-dimethylaniline in place of 5-chloro-2,4-dimethoxyaniline as starting material for the overall reaction. In this particular case, the corresponding intermediate obtained was 2-methoxy-4,5-dimethylphenylazothioacetic acid and the final product was anhydro 4-hydroxy-3-(2-methoxy-4,5-dimethylphenyl) - 1,2,3 - thiadiazolium hydroxide, M.P. 127.5–128° C.

*Analysis.*—Calcd. for $C_{11}H_{12}N_2O_2S$ (percent): C, 55.93; H, 5.2; N, 11.9. Found (percent): C, 56.27; H, 5.2; N, 11.6.

Example VI

The procedure described in Example I was repeated using an equivalent amount in moles of 2-chloro-5-methylaniline in place of 5-chloro-2,4-dimethoxyaniline as starting material for the overall reaction. In this particular case, the corresponding intermediate obtained was 2-chloro-5-methylphenylazothioacetic acid (M.P. 91–92° C.) and the final product was anhydro 4-hydroxy-3-(2-chloro-5-methylphenyl)-1,2,3-thiadiazolium hydroxide, M.P. 126–126.5° C.

*Analysis.*—Calcd. for $C_9H_7ClN_2OS$ (percent): C, 47.7; H, 3.1; N, 12.4; S, 14.1. Found (percent): C, 47.6; H, 3.3; N, 12.4; S, 13.9.

Example VII

A diazonium solution was prepared from 83 g. (0.17 mole) of 5-chloro-2-methoxyaniline, using the same general procedure described in Example I. The latter solution was then rapidly poured into a well-stirred mixture of crushed ice (1 kg.) containing 17 g. (0.185 mole) of freshly distilled thioglycolic acid. The pH of the resulting mixture was then adjusted to pH 3.5 with 1 N sodium bicarbonate and thereafter stirred for one hour at 0° C. At this point, a light-yellow gummy solid was extracted from the mixture by means of trituration with diethyl ether. The collected ether extracts were subsequently dried over anhydrous magnesium sulfate, filtered and the dried ethereal filtrate concentrated in vacuo to about one-half of its original volume. The resulting concentrate was then immediately treated with a chilled solution consisting of 50 ml. of pyridine in 150 ml. of acetic anhydride, followed by further concentration in the same manner as before. The fully-stripped reaction mixture, which resulted from this treatment, was then stirred for approximately 16 hours in a nitrogen atmosphere at 25° C. and subsequently quenched on ice. The pH of the resulting aqueous solution was then adjusted to pH 2.0 with 20% aqueous hydrochloric acid and the precipitated oil, thus formed, was extracted with methylene chloride. The organic extracts were collected, washed with water and subsequently dried over anhydrous magnesium sulfate. Concentration of the dried extracts then gave 30.3 g. of an oily substance, which was subsequently crystallized from 150 ml. of warm benzene by first treating the latter solution with activated carbon and then adding approximately 3–4 volumes of diethyl ether to the resulting filtrate. In this manner, there was ultimately obtained a 10% yield of anhydro 4-hydroxy-3-(5-chloro-2-methoxyphenyl) - 1,2,3-thiadiazolium hydroxide, M. P. 168.5–169° C.

*Analysis.*—Calcd. for $C_9H_7ClN_2O_2S$ (percent): C, 44.4; H, 2.9; N, 11.5. Found (percent): C, 44.7; H, 2.9; N, 11.4.

Example VIII

The procedure described in Example VII was repeated using an equivalent amount in moles of 2-methoxy-5-methylaniline in place of 5-chloro-2-methoxy aniline as starting material for the reaction. In this particular case, the corresponding final product obtained was anhydro 4-hydroxy - 3 - (2-methoxy-5-methylphenyl) - 1,2,3 - thiadiazolium hydroxide, M.P. 130.5–131° C.

*Analysis.*—Calcd. for $C_{10}H_{10}N_2O_2S$ (percent): C, 54.05; H, 4.54; N, 12.6; S, 14.4. Found (percent): C, 53.97; H, 4.47; N, 12.6; S, 15.5.

Example IX

The procedure described in Example VII was repeated using an equivalent amount in moles of 4-chloro-2-methoxy-5-methylaniline in place of 5-chloro-2- methoxyaniline as starting material for the reaction. In this particular case, the corresponding final product obtained was anhydro 4 - hydroxy - 3 - (4-chloro-2-methoxy-5-methylphenyl) - 1,2,3 - thiadiazolium hydroxide, M.P. 126.5–127° C.

*Analysis.*—Calcd. for $C_{10}H_9ClN_2O_2S$ (percent): C, 46.8; H, 3.5; N, 10.9; S, 12.5. Found (percent): C, 47.1; H, 3.6; N, 10.8; S, 12.8.

Example X

The procedure described in Example VII was repeated using an equivalent in moles of 2,5-dimethoxyaniline in place of 5-chloro-2-methoxyaniline as starting material for the reaction. In this particular case, the corresponding final product could not be crystallized directly from the benzene-ether mixture, but was instead converted to its hydrochloride salt via treatment in said medium with anhydrous hydrogen chloride at 0° C. In this way, there was finally obtained anhydro 4-hydroxy-3-(2,5-dimethoxyphenyl) - 1,2,3 - thiadiazolium hydroxide hydrochloride, M.P. 145–147° C., which then gave on treatment with dilute sodium bicarbonate and water at 0° C., the desired free organic base compound, viz., anhydro 4-hydroxy-3-(2,5 - dimethoxyphenyl) - 1,2,3 - thiadiazolium hydroxide, M.P. 133–133.5° C.

*Analysis.*—Calcd. for $C_{10}H_{10}N_2O_3S$ (percent): C. 50.4; H, 4.2; N, 11.8; S, 13.4. Found (percent): C, 50.6; H, 4.2; N, 11.8; S, 13.4.

Example XI

The procedure described in Example VII was repeated using an equivalent amount in moles of 2,4,5-trimethoxyaniline in place of 5-chloro-2-methoxy-aniline as starting material for the reaction. In this particular case, the corresponding final product obtained was anhydro 4-hydroxy-3-(2,4,5-trimethoxy-phenyl) - 1,2,3-thiadiazolium hydroxide, M.P. 130.5–131° C.

*Analysis.*—Calcd. for $C_{11}H_{12}N_2O_4S$ (percent): C, 49.3; H, 4.5; N, 10.5; S, 11.9. Found (percent): C, 49.4; H, 4.6; N, 10.7; S, 11.5.

Example XII

The procedure described in Example VII was repeated using an equivalent amount in moles of 2-chloro-5-methoxyaniline in place of 5-chloro-2-methoxyaniline as starting material for the reaction. In this particular case, the corresponding final product obtained was anhydro 4-hydroxy-3-(2-chloro-5-methoxyphenyl) - 1,2,3 - thiadiazolium hydroxide, M.P. 135.5–136° C.

*Analysis.*—Calcd. for $C_9H_7ClN_2O_2S$ (percent): C, 44.5; H, 2.9; N, 11.5; S, 13.2. Found (percent): C, 44.5; H, 2.9; N, 11.4; S, 12.9.

Example XIII

The procedure described in Example I was repeated using an equivalent amount in moles of 2,5-diethoxyaniline in place of 5-chloro-2,4-dimethoxyaniline as starting material for the overall reaction. In this particular case, the corresponding intermediate obtained was 2,5-diethoxyphenylazothioacetic acid (M.P. 75–76° C.) and the final product was anhydro 4-hydroxy-3-(2,5-diethoxyphenyl)-1,2,3-thiadiazolium hydroxide (isolated as the hydrochloride, M.P. 164–164.5° C.).

Example XIV

The procedure described in the previous examples is employed here to prepare the following arylanhydro 1,2,3-thiadiazolium hydroxide bases, starting from the corresponding ring-substituted aniline and proceeding thru the intermediate phenylazothioacetic acid, without isolation, in each instance:

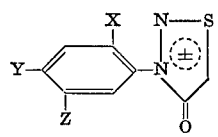

| X | Y | Z |
|---|---|---|
| Cl | H | iso-$C_3H_7$ |
| $OCH_3$ | $OC_3H_7$(iso) | Cl |
| $CH_3$ | Br | $CF_3$ |
| F | $CH_3$ | $OCH_3$ |
| Br | $OCH_3$ | $CH_3$ |
| $C_2H_5$ | H | $C_2H_5$ |
| $CF_3$ | iso-$C_3H_7$ | $CH_3$ |
| $OCH_3$ | Cl | $OC_3H_7$(n) |
| Cl | $C_2H_5$ | n-$C_3H_7$ |
| $OCH_3$ | $OC_2H_5$ | $OC_2H_5$ |
| $CF_3$ | $CH_3$ | Br |
| F | H | $CH_3$ |
| $OCH_3$ | Cl | n-$C_3H_7$ |
| Br | Br | $OC_3H_7$(iso) |
| $C_2H_5$ | n-$C_3H_7$ | Cl |
| $CH_3$ | $OC_3H_7$(n) | $CF_3$ |
| $C_2H_5$ | H | Br |
| $CH_3$ | Br | $C_2H_5$ |
| $OC_2H_5$ | Cl | $CF_3$ |
| $CF_3$ | H | $OCH_3$ |
| $OCH_3$ | n-$C_3H_7$ | n-$C_3H_7$ |
| $OC_2H_5$ | $OCH_3$ | Cl |
| Cl | H | $OC_3H_7$(n) |
| $OCH_3$ | $OC_3H_7$(n) | Same. |

Example XV

The non-toxic hydrohalide salts of the arylanhydro 1,2,3-thiadiazolium hydroxide base compounds reported previously, such as the hydrochloride, hydrobromide, hydroiodide salts, are individually prepared by first dissolving the respective free organic base compound in absolute ether and then adding sufficient anhydrous hydrogen halide gas at 0° C. to the resulting ethereal solution until saturation of same with respect to said gas is nearly complete. The desired hydrohalide salt then precipitates from the ethereal solution in crystalline form and is subsequently recovered by means of suction filtration. In this way, anhydro 4-hydroxy - 3 - (5-chloro-2,4-dimethoxyphenyl)-1,2,3-thiadiazolium hydroxide is converted to the corresponding hydrochloride salt in almost quantitative yield when dry hydrogen chloride gas is selected as the appropriate reagent of choice.

Example XVI

The nitrate, sulfate or bisulfate, phosphate or acid phosphate, citrate or acid citrate, tartrate or bitartrate, succinate, maleate, methanesulfonate, ethanesulfonate, benzenesulfonate and p-toluenesulfonate salts of each of the aforementioned arylanhydro 1,2,3-thiadiazolium hydioxide base compounds are prepared by dissolving the proper molar amounts of the respective acid and base in separate portions of ethanol and then mixing the two solutions together, followed by the addition of diethyl ether to said resulting mixture in order to effect precipitation of the desired acid addition salt therefrom. In this manner equimolar amounts of anhydro 4-hydroxy-3-(5-chloro-2,4-dimethoxyphenyl)-1,2,3-thiadiazolium hydroxide and concentrated sulfuric acid react to afford the corresponding sulfate acid addition salt. In like manner, each of the other acid addition salts are also similarly prepared.

Example XVII

A dry solid pharmaceutical composition is prepared by blending the following materials together in the proportions by weight specified below:

Anhydro 4 - hydroxy - 3 - (5 - chloro-2,4-dimethoxyphenyl)-1,2,3-thiadiazolium hydroxide _____ 50
Sodium citrate _____ 25
Alginic acid _____ 10
Polyvinylpyrrolidone _____ 10
Magnesium stearate _____ 5

After the dried composition is thoroughly blended, tablets are punched from the resulting mixture, each tablet being of such size that it contains 100 mg. of the active ingredient. Other tablets are also prepared in a similar manner containing 5, 10, 25 and 50 mg. of the active ingredient, respectively, by merely using the appropriate amount of the arylanhydro 1,2,3-thiadiazolium hydroxide base compound in each case.

Example XVIII

A dry solid pharmaceutical composition is prepared by combining the following materials together in the proportions by weight indicated below:

Anhydro 4 - hydroxy - 3-(2-methoxy-5-trifluoromethylphenyl)-1,2,3-thiadiazolium hydroxide _____ 50
Calcium carbonate _____ 20
Polyethylene glycol, average molecular weight, 4000 __ 30

The dried solid mixture so prepared is then thoroughly agitated so as to obtain a powdered product that is completely uniform. Soft elastic and hard-filled gelatin capsules containing this pharmaceutical composition are then prepared, employing a sufficient quantity of material in each instance so as to provide each capsule with 250 mg. of the active ingredient.

What is claimed is:

1. A mesoionic compound selected from the group consisting of aryl anhydro 1,2,3-thiadiazolium hydroxide bases of the formula:

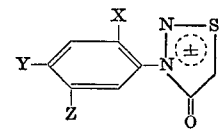

and the pharmaceutically acceptable acid addition salts thereof, wherein X is a member selected from the group consisting of fluorine, chlorine, bromine, methoxy, ethoxy and trifluoromethyl; Y is a member selected from the group consisting of hydrogen, chlorine, bromine, alkyl and alkoxy each containing up to three carbon atoms, and Z is a member selected from the group consisting of chlorine, bromine, trifluoromethyl and alkyl and alkoxy each containing up to three carbon atoms, with at most one of the variables being halogen.

2. A compound as claimed in claim 1 wherein X is chlorine, Y is hydrogen and Z is alkoxy of from one to three carbon atoms.

3. A compound as claimed in claim 1 wherein X is methoxy, Y is chlorine and Z is alkyl of from one to three carbon atoms.

4. A compound as claimed in claim 1 wherein X is methoxy, Y is chlorine and Z is alkoxy of from one to three carbon atoms.

5. A compound as claimed in claim 1 wherein X is methoxy, Y is alkyl of from one to three carbon atoms and Z is chlorine.

6. A compound as claimed in claim 1 wherein X is methoxy, Y is alkoxy of from one to three carbon atoms and Z is chlorine.

7. A compound as claimed in claim 1 wherein X is methoxy, and Y and Z are each alkoxy of from one to three carbon atoms.

8. Anhydro 4 - hydroxy - 3 - (5-chloro-2,4-dimethoxyphenyl)-1,2,3-thiadiazolium hydroxide.

9. Anhydro 4-hydroxy-3-(2-methoxy-5-trifluoromethylphenyl)-1,2,3-thiadiazolium hydroxide.

10. Anhydro 4-hydroxy-3-(5-chloro-2-methoxyphenyl)-1,2,3-thiadiazolium hydroxide.

11. Anhydro 4 - hydroxy - 3 - (5-chloro-2-methoxy-4-methylphenyl)-1,2,3-thiadiazolium hydroxide.

12. Anhydro 4 - hydroxy - 3-(2,4,5-trimethoxyphenyl)-1,2,3-thiadiazolium hydroxide.

References Cited

Duffin et al.: J. Chem. Soc. (London), 1956, pp. 3189–99.

ALEX MAZEL, Primary Examiner

R. J. GALLAGHER, Assistant Examiner

U.S. Cl. X.R.

260—192; 424—270